Nov. 3, 1931.   W. NODDACK ET AL   1,829,756
HOMOGENEOUS BODY CONSISTING OF RHENIUM
Filed May 18, 1929
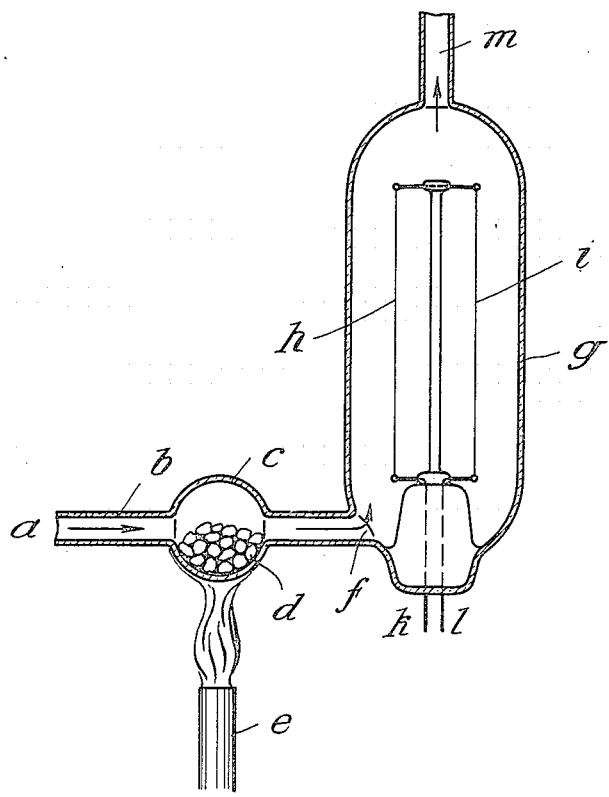
Inventors
Walter Noddack, +
Ida Noddack
by Knight Bro
       Attorney.

Patented Nov. 3, 1931

1,829,756

UNITED STATES PATENT OFFICE

WALTER NODDACK AND IDA NODDACK, OF BERLIN-GRUNEWALD, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

HOMOGENEOUS BODY CONSISTING OF RHENIUM

Application filed May 18, 1929, Serial No. 364,245, and in Germany June 18, 1925.

Our invention relates to homogeneous bodies consisting of rhenium, and more particularly to electric glowers or incandescent filaments, such as are used in electric glowlamps or incandescent lamps, vacuum tubes, electric arc lamps and for similar purposes. Rhenium is a chemical element newly discovered by us a few years ago. It is the chemical element which in the periodic system of classification of the chemical elements bears the classification number 75. Rhenium occurs in small quantities in platinum ores and other minerals, such as molybdenite. It may, for instance, be obtained from these minerals by being precipitated from their solutions as sulphides or by the rhenium being by fractional distillation separated from the remaining constituents in the form of oxides, or by precipitating the great excess of molybdenum by means of phosphates. Such processes have several times been described by us in publications. The sulphides or the oxides thus obtained may then easily be reduced by means of hydrogen. A pulverized material is then first obtained, which consists of pure metal. This material may be converted into a homogeneous metallic body in various ways, for instance by compressing the powder and subjecting the pressed body in a vacuum or in an inert atmosphere to the action of an electric arc or by fusing it by direct resistance heating by passing an electric current through it. As support for the body a plate consisting of compressed rhenium powder is preferably used.

Another process of obtaining homogeneous bodies of rhenium metal consists in evaporating an easily dissociating and easily volatilizing compound of rhenium, such as rhenium hexachloride or rhenium heptachloride, and passing it over an incandescent surface. A homogeneous layer of metallic lustre of rhenium metal is then deposited upon the incandescent surface. If this layer is kept at incandescence for a considerable time and the chloride vapors of rhenium are passed over it, the layer becomes gradually thicker.

Homogeneous bodies of rhenium metal are of considerable importance for many industrial purposes. Rhenium has a very high melting or fusing point. The fusing point is about the same as that of tungsten, probably even higher. Rhenium is therefore particularly suitable for electric glowers, and luminous or incandescent bodies. In comparison with tungsten it has the advantage, that if heated in a vacuum it atomizes or volatilizes far less easily than the tungsten. It may thus be heated to considerably higher temperatures than tungsten without the disturbances occurring, which are well known when heating tungsten. We therefore employ rhenium as electric incandescent bodies for all purposes in which high temperatures are to be attained. The rhenium is used either by itself or in combination with other metals of high fusing points, more particularly in combination with tungsten. It suffices to apply a thin coating of rhenium to a tungsten filament to obtain a considerable improvement of the tungsten filament. Since the rhenium is rather expensive we prefer this process for many purposes.

In order to obtain incandescent bodies or filaments, which consist mainly or solely of rhenium, we produce homogeneous bodies of rhenium by sintering and fusing in a vacuum and then bring these bodies into the desired shape by mechanical treatment, such as hammering, rolling, drawing and the like, or we employ a thin filament consisting of another metal, such as platinum or tungsten, and heat this filament by sending an electric current through it, in an atmosphere containing vapors of a chemical compound of rhenium easily dissociating at high temperatures. Metallic rhenium is then deposited upon the incandescent filament. This process is continued until a rhenium filament of the desired thickness is obtained. By regulating the temperature and the supply of vapors it is possible to obtain very uniform or homogeneous filaments. If, for instance, a tungsten filament of 0.02 mm. diameter is treated in the manner described until it has reached a diameter of 0.2 mm. the content of tungsten amounts to about 1 per cent only of the entire mass.

The vapors from which the rhenium is precipitated upon the incandescent filament may, for instance, consist of a mixture of chlorine compounds of rhenium. The hexachloride and heptachloride of rhenium are particularly suitable for the purpose. The vapors may be generated by placing these compounds in the solid state into a glass bulb, which is in communication with the receptacle in which the wire is brought to incandescence. If this glass bulb is carefully heated by means of a gas flame or in any other suitable manner, vapors develop at once and enter the receptacle in which the incandescent wire is housed. The temperatures of the incandescent wire lie between 1000° and 1600° C. The gases generated during the dissociation or decomposition are drawn off by means of a pump. Preferably the pump is used to keep the pressure within the receptacle low. In order to prevent un-decomposed rhenium compounds from penetrating into the pump a well cooled receiver is preferably interposed between the receptacle in which the incandescent wire is located and the pump. The rhenium containing vapors then condense in this receiver.

Instead of introducing the chlorides of rhenium in the solid state into the glass bulb or flask, as described above, metallic rhenium may be placed into the bulb and chlorine be passed over it. The chlorides of the rhenium then form in the glass bulb. If this glass bulb is simultaneously heated, the chlorides in the form of vapor admix with the current of the excessive chlorine and enter together with it into the container in which the wire is brought to incandescence.

In the drawing affixed hereto such an arrangement is illustrated by way of example.

Referring to this drawing it will be seen that the chlorine enters at $a$ into the tube $b$, which expands into a bulb $c$, in which is placed the rhenium $d$. When the bulb $c$ is moderately heated by a source of heat $e$, the vapors of the chlorides admix with the current of chlorine. The mixture enters at $f$ into the container $g$ in which there are provided two very fine tungsten filaments $h$ and $i$. These are brought to incandescence by passing an electric current through them by means of the electrodes $k$ and $l$. Rhenium from the gas and vapor mixtures is then uniformly deposited on the filaments. The chlorine enters into the tube $m$, which leads to the pump. When the layer of rhenium has attained the desired thickness the container $g$ may serve as the bulb of an incandescent lamp. The tube $b$ is then fused and sealed at $f$, and the container $g$ is exhausted through the tube $m$, which is finally likewise removed by fusing.

Rhenium containing glowers of incandescent bodies may also be obtained by working a fine powder of the rhenium metal, as obtained by reducing its oxides by means of hydrogen, by means of a suitable binding agent into a plastic mass and producing filaments from this mass by squirting or forcing it through dies or nozzles. These filaments or wires are then subjected to a further treatment in accordance with the properties of the binder. The binder is then either volatilized and the filaments sintered together into a strong continuous mass, or the process is carried out in such a way that the binder is chemically changed or converted, so that a substance is produced, which binds the rhenium metal powder or alloys with it. Such a binder is, for instance, the easily decomposable ammonium perrhenate, which possesses a very high binding capacity and in a current of hydrogen is reduced to rhenium.

Various modifications and changes may be made without departing from the spirit and the scope of the invention, and we desire, therefore, that only such limitations shall be placed thereon as are imposed by the prior art.

We claim as our invention:

1. An electric glower containing rhenium metal.
2. An electric glower consisting of rhenium metal.
3. A glower for incandescent electric lamps containing rhenium.
4. Incandescent electric lamp containing a glower containing rhenium.

In testimony whereof we affix our signatures.

WALTER NODDACK.
IDA NODDACK.